US006904451B1

(12) United States Patent
Orfitelli et al.

(10) Patent No.: US 6,904,451 B1
(45) Date of Patent: Jun. 7, 2005

(54) WIRELESS NETWORKED PRESENTATION SYSTEM

(75) Inventors: William A. Orfitelli, Pittsford, NY (US); Bruce D. Newell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 836 days.

(21) Appl. No.: 09/723,041

(22) Filed: Nov. 27, 2000

(51) Int. Cl.[7] .............................................. G06F 15/16
(52) U.S. Cl. ..................................... 709/203; 709/204
(58) Field of Search ................................ 709/203, 225, 709/204, 229, 201

(56) References Cited

U.S. PATENT DOCUMENTS 6,483,568 B1 * 11/2002 Folio ........................... 352/20
6,560,637 B1 * 5/2003 Dunlap et al. ............... 709/204

* cited by examiner

*Primary Examiner*—Mehmet B. Geckil
(74) *Attorney, Agent, or Firm*—Peyton C. Watkins

(57) ABSTRACT

A presentation system having both video for projecting images for viewing by a user and audio for broadcasting sound in which both the audio and video are under central control, the presentation system comprises a digital projector having a wireless local area network connection for displaying the images external to the projector for viewing by the user, and for permitting connection to devices wirelessly connected to the local area network; a processor having a wireless local area network connection which processor includes digital images which are transmitted to the projector for display, and which said processor permits connection to devices wirelessly connected to the local area network; audio speakers having a wireless local area network connection for projecting audio associated with the images or audio from an individual, and for permitting connection to devices wirelessly connected to the local area network; and a central command processor having a wireless local area network connection for directing the display of images and audio being broadcast, and permitting connection to devices wireless connected to the local area network.

18 Claims, 1 Drawing Sheet

WIRELESS NETWORKED PRESENTATION SYSTEM

FIELD OF THE INVENTION

The invention relates to digital projectors having multimedia devices, and more particularly, to such digital projectors having multimedia devices in which the multimedia devices and projector are wirelessly connected together and all the devices are under central control of the presenter.

BACKGROUND OF THE INVENTION

Digital projectors connected to laptop or personal computers allow presenters to perform a myriad of functions that were previously difficult or impossible. These functions include, for example, the sharing of the projector between several personal computers simultaneously, or the control of the operation of a personal computer from the hand held, remote-control of the projector. When all the features are in use, the number of interconnections between a projector, laptop, and other multimedia devices can grow to an unmanageable tangle of cables. This is compounded by a variety of interconnect standards that require multiple adapters. Some presenters may opt not to use such systems because of this complexity, and therefore, they cannot benefit from these enhanced capabilities.

Attempts at reducing the cable and adapter requirements typically involve the incorporation of presentation devices into the projector itself, such as internal audio amplifier and speakers, or the incorporation of several adapters and interfaces into a single multi-function adapter.

Although the presently known and utilized system is satisfactory, it includes drawbacks. As previously stated, these systems require an unmanageable number of connections which are difficult to install.

SUMMARY OF THE INVENTION

The present invention is directed to overcoming one or more of the problems set forth above. Briefly summarized, according to one aspect of the present invention, a presentation system having both video for projecting images for viewing by a user and audio for broadcasting sound in which both the audio and video are under central control, the presentation system comprises (a) a digital projector having a wireless local area network connection for displaying the images external to the projector for viewing by the user, and for permitting connection to devices wireless connected to the local area network; (b) a processor having a wireless local area network connection which processor includes digital images which are transmitted to the projector for display, and which said processor permits connection to devices wirelessly connected to the local area network; (c) audio speakers having a wireless local area network connection for projecting audio associated with the images or audio from an individual, and for permitting connection to devices wirelessly connected to the local area network; and (d) a central command processor having a wireless local area network connection for directing the display of images and audio being broadcast, and for permitting connection to devices wirelessly connected to the local area network.

It is an object of the present invention to provide presentation framework software that has components that run on all of the presentation computers and devices that allows for an ad-hoc discovery of devices as they enter the presentation environment, creates and destroys connections, and delivers the device controls to the user.

It is the object of this invention to provide a means for communicating between digital projectors and presentation devices that reduces or eliminates the need for cables. Additionally, the present invention provides flexibility in where status and control functions of presentation devices are delivered, and allows presentation devices to provide their services interchangeably to one or more presentation clients.

This object is achieved by using a high-speed wireless presentation network with intelligent presentation devices. Recent advances in wireless RF technology make it possible to deliver audio, video, status and control in a digital format using a network protocol at acceptable quality. Flexibility is provided by allowing for a wired network as an alternative. While a wired network requires cables, it simplifies the cabling by requiring the same cable for all devices and allows for multiple interconnect topologies.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

Digital projectors that are connected to laptop or personal computers permit presenters to perform a myriad of functions that were difficult or impossible to do before, such as the sharing of the projector between several PCs simultaneously or the control of the operation of a PC from the hand-held remote control of the projector. When all the features are in use, the number of interconnections between a projector, laptop, and other multimedia devices can grow to an unmanageable tangle of cables. This is compounded by a variety of interconnect standard that require multiple adapters. The typical presenter is unable and/or unwilling to deal with this complexity and therefore cannot benefit from the enhanced capabilities.

DETAILED DESCRIPTION OF THE INVENTION

Figure 1:
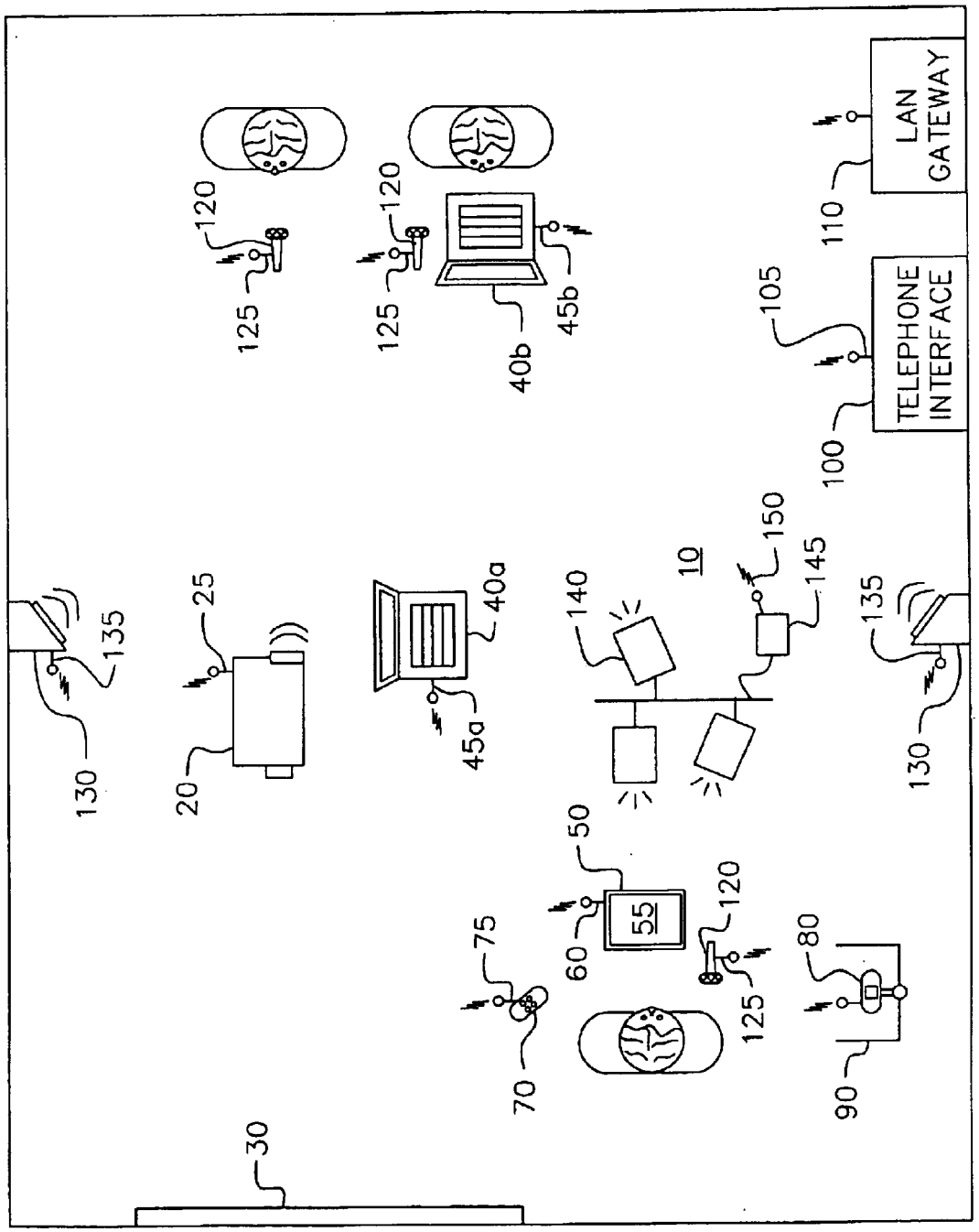
FIG. 1 is diagram depicting the presentation system of the present invention.

As used herein, multimedia devices includes, for example, any of the apparatuses shown in FIG. 1. Such multimedia devices may have either or both of audio or visual capabilities.

Referring to FIG. 1, there is shown a digital presentation system 10 of the present invention. The presentation system includes a digital projector 20 having a processor (not shown) therein for providing computer-processing capabilities, and includes a local area network connection (referred to herein as embedded software and is described herein below) for providing wireless communication to other multimedia devices. The embedded software is executed by the processor and comprises wireless communications software having real-time communication hooks for permitting the digital projector to communicate with other multimedia devices on a real-time basis. Such software may be input, for example, via a PCMCIA card that is inserted into the digital projector for execution by the processor, as is well known in the art. The digital projector 20 further includes an antenna 25 for receiving and transmitting radio-frequency (RF) signals and passing them to or from the embedded software. As is well known in the art, the digital projector 20 also includes devices for permitting images to be displayed external to the projector. A screen 30 is provided for receiving the images from the projector for display thereon.

As is obvious to those skilled in the art, the digital projector 20 includes wireless network devices that enable the wireless transmission. Such wireless network devices are included in all the multimedia devices having wireless transmission capabilities. Still further, the digital projector 20 includes an internal audio amplifier and speaker that is available to the user. The digital projector 20 may also contain readers (not shown) for removable media such as a DVD reader or a PC card reader.

The digital presentation system 10 also includes personal computers 40 each having a processor (not shown) therein. The personal computers 40 also include a local area network connection via embedded software for providing wireless communication to the other multimedia devices. Antennas 45 are respectively connected to the personal computers 40 for receiving and transmitting radio-frequency signals and passing them to or from the embedded software. The personal computers 40 may also include video images, either still or motion images, which are transmitted to the digital projector 20 for display. These images may be compressed using MPEG standards, or any other well-known standard. In the preferred embodiment, the presenter uses the computer 40*a* and participants use the other computers, such as computer 40*b*.

The presentation system can also include a personal computer 50 having a touch-screen 55, and also having a local area network connection via embedded software for permitting communication with the other multimedia devices. An antenna 60 is connected to the personal computer 50 for receiving and transmitting radio-frequency signals and passing them to or from the embedded software. The touch-screen computer 50 is the central unit from which the presenter controls and directs all other multimedia devices. Alternatively, control functions may be performed by any of the personal computers 40. The touch-screen computer is a "hand held" computer for the presenter to use while at a podium or while moving about the room.

A hand held, remote-control unit 70 provides volume control and like functions when a very limited set of control functionality is required. The unit 70 includes an antenna 75 and local area network connection both of which have already been described herein.

A digital camera 80, either still or motion, rests over a copy stand 90 on which hardcopy material may be placed. Likewise, the camera 80 includes a local area connection via embedded software for permitting communication with the other multimedia devices. The camera 80 captures the image of the hardcopy material and transmits this to the digital projector 20. This is controlled by the presenter via the touch-screen computer 50.

The presentation system 10 includes a telephone 100 with conferencing capabilities and with a local area network connection via embedded software for communicating with the other multimedia devices; an antenna 105 provides transmission capabilities and passing them to or from the embedded software. The presentation system 10 further includes a LAN access point 110 having a local area network connection via embedded software for communicating with the other multimedia devices. As is obvious to those skilled in the art, the LAN access point 110 provides access to other local area networks for connecting the presentation system to other local area networks.

Microphones 120 are randomly provided throughout the presentation area for selectively providing audio from the presenter or non-presenters. The microphones include antennas 125 and local area network connection both of which have been described herein. The microphones 120 are controlled from the remote control unit 70 or the presenter computer. In this regard, audio speakers 130 are placed through the presentation area for providing audio for the system. They also include antennas 135 and a local area network connection. Audio is sent over the network in a compressed form that can be transferred, and decompressed with minimal delay. The network transport protocol is designed so that the audio is guaranteed a percentage of the network bandwidth to prevent quality loss. The system via the presenter computer can also detect other microphones as they enter the room.

Lighting 140 is randomly positioned throughout the presentation area, and is connected to a RF control unit 145 having an antenna 150 and a local area network connection. The lighting 140 can be dimmed or brighten by the presenter.

The invention has been described with reference to a preferred embodiment. However, it will be appreciated that variations and modifications can be effected by a person of ordinary skill in the art without departing from the scope of the invention.

PARTS LIST

10 digital presentation system
20 digital projector
25 antenna
30 screen
40*a* personal computer
40*b* personal computer
45*a* antenna
45*b* antenna
50 "touch screen" personal computer
55 touch screen
60 antenna
70 hand held, remote-control unit
75 antenna
80 digital camera
90 copy stand
100 telephone
105 antenna
110 LAN access point
120 microphones
125 antenna
130 audio speaker
135 antenna
140 lighting
145 RF control unit
150 antenna

What is claimed is:

1. A presentation system having both video for projecting images for viewing by a user and audio for broadcasting sound in which both the audio and video are under central control over a wireless local area network, the presentation system comprising:

(a) a digital projector having a wireless local area network connection for displaying the images external to the projector for viewing by the user, and for permitting real-time connection to devices wirelessly connected to the local area network; and (b) a central processor having a wireless local area network connection which processor includes digital images which are transmitted in real-time to the projector for display, and which said processor permits real-time connection to devices wirelessly connected to the local area network; wherein the central processor further includes directing the display of images and audio being broadcast both in real-time, and for permitting real-time connection to devices wirelessly connected to the local area network.

2. The presentation system as in claim 1 further comprising a plurality of speakers having a wireless local area network connection for permitting connection to devices wireless connected to the local area network, and for permitting remote audio broadcasting.

3. The presentation system as in claim 1, wherein the local area network connections include real-time elements for permitting real-time audio broadcasting.

4. The presentation system as in claim 1 further comprising a camera having a wireless local area network connection for permitting connection to devices wireless connected to the local area network, and for permitting transmission of images from the camera to the projector for display.

5. The presentation system as in claim 1 further comprising a local area network access point connected to the local area network connections for permitting access to other local area networks.

6. The presentation system as in claim 1 further comprising a telephone interface having a local area network connection connected to the local area network connections for permitting telephone conferencing.

7. The presentation system as in claim 1 further comprising a remote control having a local area network connection for permitting remote control of other devices connected to the local area network.

8. The presentation system as in claim 1 further comprising presentation framework software having components that are respectively executed on all presentation processors and devices and allows for an ad-hoc discovery of devices as they enter the presentation environment, creates and destroys connections, and delivers the device control to the user.

9. The presentation system as in claim 1 further comprising lighting having a local area network connection for permitting selective dimming or brightening.

10. A presentation system having both video for projecting images for viewing by a user, and audio for broadcasting sound in which both the audio and video are under central control, the presentation system comprising:

(a) a digital projector having a wireless local area network connection for displaying the images external to the projector for viewing by the user, and for permitting real-time connection to devices wirelessly connected to the local area network, wherein the digital projector includes a processor having a wireless local area network connection, and having digital images for display; and (b) a central command processor having a wireless local area network connection for directing the display of images and audio being broadcast both in real-time, and for permitting real-time connection to devices wireless connected to the local area network.

11. The presentation system as in claim 10 further comprising a plurality of speakers having a wireless local area network connection for permitting connection to devices wireless connected to the local area network, and for permitting remote audio broadcasting.

12. The presentation system as in claim 10, wherein the local area network connections include real-time elements for permitting real-time audio broadcasting.

13. The presentation system as in claim 10 further comprising a camera having a wireless local area network connection for permitting connection to devices wirelessly connected to the local area network, and for permitting transmission of images from the camera to the projector for display.

14. The presentation system as in claim 10 further comprising a local area network gateway connected to the local area network connections for permitting access to other local area networks.

15. The presentation system as in claim 10 further comprising a telephone interface having a local area network connection connected to the local area network connections for permitting telephone conferencing.

16. The presentation system as in claim 10 further comprising a remote control having a local area network connection for permitting remote control of other devices connected to the local area network.

17. The presentation system as in claim 10 further comprising presentation framework software having components that are respectively executed on all presentation processors and devices and allows for an ad-hoc dicovery of devices as they enter the presentation environment, creates and destroys connections, and delivers the device control to the user.

18. The presentation system as in claim 10 further comprising lighting having a local area network connection for permitting selective dimming or brightening.

* * * * *